G. M. BEARDSLEY.
Straw Cutter.
No. 63,692.
Patented April 9, 1867.
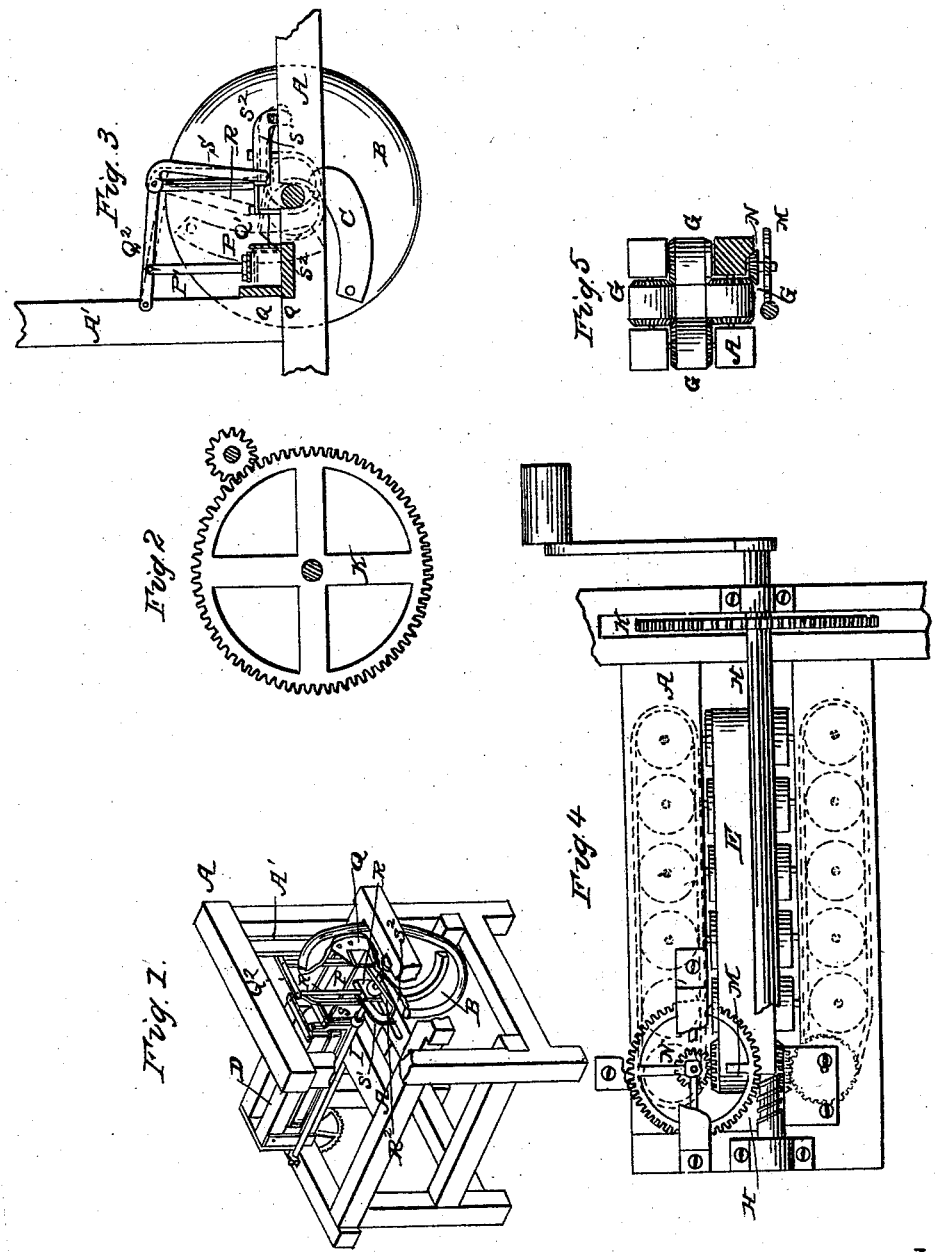

United States Patent Office

GEORGE M. BEARDSLEY, OF FENTONVILLE, MICHIGAN, ASSIGNOR TO HIMSELF AND C. D. BONTELL AND G. CARPENTER.

Letters Patent No. 63,692, dated April 9, 1867.

IMPROVEMENT IN STRAW-CUTTERS.

*The Schedule referred to in these Letters Patent and making part of the same.*

TO ALL WHOM IT MAY CONCERN:

Be it known that I, GEORGE M. BEARDSLEY, of Fentonville, in the county of Genesee, and State of Michigan, have invented a new and useful Improvement in Hay, Straw, and Vegetable-Cutters; and I do hereby declare that the following is a full, clear, and exact description of the construction and operation of the same, reference being had to the annexed drawings, made part of this specification, in which—

Figure 1 is a perspective view.
Figure 2 is an elevation showing the driving-wheels.
Figure 3, an elevation of part of the mechanism, as seen from behind.
Figure 4, a bottom view of the feed-belt and driving gearing.
Figure 5, an elevation, showing the belt-pulleys and mode of gearing them.
In the several figures the same letters refer to identical parts.

My improvements consist in the construction of the knife and the mode of arranging it in a solid fly-wheel; also in the mode of feeding by means of four endless belts feeding the straw continuously towards the knife, and in an arrangement of mechanism for operating the jaws so that they shall be relaxed for the free movement of the straw as fed and closely compressed when receiving the action of the knife.

A is the main frame, strongly put together so as to preserve the rigidity of the machinery. Power is communicated by a crank or pulley on the shaft H, which passes under the main-frame timbers and sustains the driving spur-wheel K which drives the pinion L on the end of the shaft I which passes across the machine, and has suspended on its opposite end a solid fly-wheel, B, formed with a slot to receive the knife C, and conforming to the shape of the knife so as to permit the cuttings to fall freely through the wheel. The knife is shown in the separate drawing, part of fig. 3, and marked C. This knife is set eccentrically upon the back of the fly-wheel B, so that with the revolution of the wheel it shall, coming in contact with the straw first at its rounded heel, make a shearing cut as it is drawn from heel to point over the straw projecting from the mouth Q of the feed pipe  The straw or other material is thrown into the feeding-trough D, where it falls upon the endless belt E, and is by this belt, and the others combined with it, as will be explained hereafter, drawn towards the cutting-knife. These belts are driven by four rollers, G, set so as to form a square, and having bevelled gearing on each end meshing into the gearing upon the adjoining roller. The lower roller derives motion from the bevel-wheel N, and this from the spur-wheel M, the two being on the same shaft. Motion is communicated to the wheel M by the endless screw H' on the shaft H. The four endless belts (the upper one is short, so as to permit the introduction of the straw) draw the straw towards the cutter, passing through the trough Q in front of the driving-pulleys G. The trough Q is terminated by a square mouth directly against the knife C, so as to only permit the knife to pass without actually touching. The upper and inner sides are hinged at the end near the rollers G, so as to be permitted an outward and inward oscillation. These sides are marked respectively P and $Q^1$. On the shaft I is attached an eccentric, working in an ordinary eccentric-strap, and thus communicating a reciprocating motion to the pitman R, attached by a pivot to the end of the lever $Q^2$, the other end of which is pivoted to the piece A', part of the main frame. To this lever is also pivoted the rod P', the lower end of which is hinged to the mouth end of the top piece P of the trough Q. A rod, S, is in like manner pivoted to the end of the lever at the point of attachment of the pitman R. The lower end of this rod is in like manner attached by a pivot to the arm of the bell-crank $S^1$, to which is also attached the rod $S^2$ in such manner that it will receive a reciprocating motion with the oscillation of the bell-crank $S^1$. The other end of this rod, $S^2$, is attached to the mouth end of the side $Q^1$. As the sides P and $Q^1$ of the trough are hinged at their opposite end, the eccentric being so set on the shaft as to cause the rods P' and $S^2$ to be retracted when the knife has passed the mouth of the trough, the jaws will then be opened so that the straw may be freely fed forward, but as the knife approaches the mouth the jaws are forced together and the straw is closely compressed, so that the knife will have a firm and comparatively unyielding body upon which to cut.

What I claim as my invention, and desire to secure by Letters Patent, is—

1. I claim the knife C when shaped as shown, and set eccentrically upon a fly-wheel, solid except as to a slot conforming to the knife, substantially as and for the purpose set forth.

2. I claim the endless bands E in combination with the pulleys G, constructed, arranged, and receiving motion substantially in the manner and for the purpose set forth.

3. A mechanism for operating automatically and simultaneously the jaws P and $Q^t$ in relation to the knife C, substantially as and for the purpose set forth.

In testimony whereof I have signed my name to this specification in the presence of two subscribing witnesses.

GEORGE M. BEARDSLEY.

Witnesses:
C. J. ROLLAND,
WM. W. BOOTH.